United States Patent
Navratil et al.

(10) Patent No.: US 12,464,543 B2
(45) Date of Patent: Nov. 4, 2025

(54) METHODS AND APPARATUSES FOR RADIO COMMUNICATION

(71) Applicant: Nokia Technologies Oy, Espoo (FI)

(72) Inventors: David Navratil, Helsinki (FI); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 364 days.

(21) Appl. No.: 18/040,222

(22) PCT Filed: Aug. 6, 2020

(86) PCT No.: PCT/EP2020/072187
§ 371 (c)(1),
(2) Date: Feb. 1, 2023

(87) PCT Pub. No.: WO2022/028704
PCT Pub. Date: Feb. 10, 2022

(65) Prior Publication Data
US 2023/0276469 A1    Aug. 31, 2023

(51) Int. Cl.
H04W 72/30        (2023.01)
H04L 12/18        (2006.01)

(52) U.S. Cl.
CPC ........... H04W 72/30 (2023.01); H04L 12/189 (2013.01)

(58) Field of Classification Search
None
See application file for complete search history.

(56) References Cited

U.S. PATENT DOCUMENTS

| | | | |
|---|---|---|---|
| 9,432,870 B2* | 8/2016 | Jung | H04W 64/00 |
| 9,713,122 B2* | 7/2017 | Kuo | H04W 72/30 |
| 9,843,828 B2* | 12/2017 | Phillips | H04N 21/2385 |
| 9,843,986 B2* | 12/2017 | Poitau | H04W 76/14 |
| 10,219,292 B2* | 2/2019 | Damnjanovic | H04L 1/1812 |
| 10,237,589 B2* | 3/2019 | Nair | H04N 21/4384 |
| 10,405,332 B2* | 9/2019 | Papasakellariou | H04B 7/024 |
| 10,498,368 B2* | 12/2019 | Salomons | H03M 13/353 |
| 10,645,641 B2* | 5/2020 | Li | H04W 74/0808 |
| 10,904,913 B2* | 1/2021 | Kim | H04W 72/121 |
| 11,452,032 B2* | 9/2022 | Gupta | H04W 4/021 |
| 11,470,618 B2* | 10/2022 | Zhou | H04L 1/1822 |
| 11,470,652 B2* | 10/2022 | Kim | H04W 74/0891 |
| 11,477,820 B2* | 10/2022 | Park | H04L 5/0094 |

(Continued)

FOREIGN PATENT DOCUMENTS

| | | |
|---|---|---|
| CN | 1774124 A | 5/2006 |
| CN | 101039454 A | 9/2007 |

(Continued)

OTHER PUBLICATIONS

Office action received for corresponding Japanese Patent Application No. 2023-507942, dated Mar. 25, 2024, 4 pages of office action and 8 pages of translation available.

(Continued)

*Primary Examiner* — Melvin H Pollack
(74) *Attorney, Agent, or Firm* — Nokia Technologies Oy

(57) ABSTRACT

There is provided a method including receiving multicast data via a multicast transport channel that is associated with a plurality of multicast control channels. At least one multicast control channel configuration of the multicast control channels is associated with at least one location indicator.

20 Claims, 7 Drawing Sheets

(56) References Cited

U.S. PATENT DOCUMENTS

| | | | | |
|---|---|---|---|---|
| 11,503,663 | B2* | 11/2022 | Zheng | H04W 76/19 |
| 11,553,557 | B2* | 1/2023 | Noh | H04W 8/24 |
| 11,582,740 | B2* | 2/2023 | Seo | H04W 24/08 |
| 11,864,181 | B2* | 1/2024 | Hong | H04L 5/0058 |
| 11,864,186 | B2* | 1/2024 | Zhou | H04L 5/001 |
| 11,936,593 | B2* | 3/2024 | Xu | H04L 5/0092 |
| 11,943,739 | B2* | 3/2024 | Cha | G01S 5/0268 |
| 11,978,344 | B2* | 5/2024 | Kwak | G08G 1/163 |
| 11,979,324 | B2* | 5/2024 | Ko | H04W 72/12 |
| 11,979,865 | B2* | 5/2024 | Muruganathan | H04W 72/23 |
| 12,003,435 | B2* | 6/2024 | Mondal | H04W 72/044 |
| 12,010,061 | B2* | 6/2024 | Kim | H04W 4/44 |
| 12,028,770 | B2* | 7/2024 | Yao | H04W 24/08 |
| 12,048,054 | B2* | 7/2024 | Mihály | H04W 76/12 |
| 12,052,602 | B2* | 7/2024 | Ali | H04W 4/40 |
| 12,052,688 | B2* | 7/2024 | Kim | H04L 27/26 |
| 12,069,672 | B2* | 8/2024 | Seo | H04W 72/23 |
| 12,075,411 | B2* | 8/2024 | Lee | H04B 17/24 |
| 12,081,491 | B2* | 9/2024 | Lee | H04W 76/14 |
| 12,082,201 | B2* | 9/2024 | Yi | H04W 72/23 |
| 12,095,566 | B2* | 9/2024 | Hwang | H04L 1/1812 |
| 12,120,661 | B2* | 10/2024 | He | H04W 72/0446 |
| 12,127,080 | B2* | 10/2024 | Åkesson | H04W 4/06 |
| 12,127,169 | B2* | 10/2024 | Wang | H04W 72/0446 |
| 12,143,230 | B2* | 11/2024 | Park | H04L 1/1893 |
| 12,143,858 | B2* | 11/2024 | Xie | H04W 28/0278 |
| 12,144,019 | B2* | 11/2024 | Lee | H04W 72/566 |
| 12,150,114 | B2* | 11/2024 | Lee | H04L 5/0055 |
| 12,166,609 | B2* | 12/2024 | Li | H04L 5/0053 |
| 12,170,970 | B2* | 12/2024 | Åström | H04L 5/0053 |
| 12,177,739 | B2* | 12/2024 | Sirotkin | H04W 4/02 |
| 12,192,753 | B2* | 1/2025 | Zaus | H04W 60/04 |
| 12,192,825 | B2* | 1/2025 | Park | H04W 28/0268 |
| 12,192,908 | B2* | 1/2025 | Baek | H04W 72/02 |
| 12,200,518 | B2* | 1/2025 | Park | H04W 92/18 |
| 12,200,547 | B2* | 1/2025 | Li | H04W 36/0058 |
| 12,207,256 | B2* | 1/2025 | Frenne | H04L 5/0048 |
| 12,212,443 | B2* | 1/2025 | Kim | H04L 27/01 |
| 12,219,560 | B2* | 2/2025 | Park | H04L 1/1861 |
| 12,225,393 | B2* | 2/2025 | Zhou | H04L 1/203 |
| 12,225,443 | B2* | 2/2025 | Liao | H04N 21/44008 |
| 12,238,025 | B2* | 2/2025 | Zhang | H04L 5/0053 |
| 12,238,701 | B2* | 2/2025 | Lee | H04L 5/0094 |
| 12,238,747 | B2* | 2/2025 | Belleschi | H04W 4/40 |
| 12,245,139 | B2* | 3/2025 | Guo | H04W 8/24 |
| 12,256,400 | B2* | 3/2025 | Islam | H04L 1/1896 |
| 2012/0263043 | A1 | 10/2012 | Xu | |
| 2013/0142053 | A1 | 6/2013 | Amerga et al. | |
| 2013/0170357 | A1 | 7/2013 | Anchan et al. | |
| 2016/0150590 | A1* | 5/2016 | Pocha | H04L 12/185 |
| | | | | 370/329 |
| 2016/0249183 | A1 | 8/2016 | Kim et al. | |
| 2016/0285935 | A1 | 9/2016 | Wu et al. | |
| 2017/0265166 | A1 | 9/2017 | Hosseini et al. | |
| 2018/0049160 | A1 | 2/2018 | Hong et al. | |
| 2018/0167910 | A1* | 6/2018 | Zeng | H04L 5/0098 |
| 2018/0176744 | A1 | 6/2018 | Li et al. | |
| 2018/0206080 | A1 | 7/2018 | Chen et al. | |
| 2019/0090098 | A1 | 3/2019 | Byun et al. | |
| 2019/0190662 | A1 | 6/2019 | Lee et al. | |
| 2020/0128572 | A1 | 4/2020 | Dinan et al. | |
| 2021/0195543 | A1* | 6/2021 | Lee | H04W 56/0045 |
| 2022/0077993 | A1* | 3/2022 | Hong | H04W 72/20 |
| 2023/0147173 | A1* | 5/2023 | Matsumura | H04W 72/1273 |
| | | | | 370/329 |
| 2023/0164697 | A1* | 5/2023 | Kong | H04W 4/48 |
| | | | | 370/318 |
| 2023/0262494 | A1* | 8/2023 | Dai | H04W 64/006 |
| | | | | 370/252 |

FOREIGN PATENT DOCUMENTS

| | | |
|---|---|---|
| CN | 101925000 A | 12/2010 |
| CN | 101925011 A | 12/2010 |
| CN | 101998275 A | 3/2011 |
| CN | 102123134 A | 7/2011 |
| CN | 102158808 A | 8/2011 |
| CN | 102301811 A | 12/2011 |
| CN | 105264922 A | 1/2016 |
| CN | 107333246 A | 11/2017 |
| CN | 111225345 A | 6/2020 |
| EP | 2306757 A1 | 4/2011 |
| EP | 2512160 A1 | 10/2012 |
| EP | 3337198 A1 | 6/2018 |
| EP | 3337199 A1 | 6/2018 |
| JP | 2007-251944 A | 9/2007 |
| JP | 2008535365 A | 8/2008 |
| JP | 2015503285 A | 1/2015 |
| JP | 2015142225 A | 8/2015 |
| JP | 2018-110389 A | 7/2018 |
| JP | 2018-530207 A | 10/2018 |
| WO | 2006/104335 A2 | 10/2006 |
| WO | 2017/166996 A1 | 10/2017 |
| WO | 2017/171923 A1 | 10/2017 |

OTHER PUBLICATIONS

Office action received for corresponding Chinese Patent Application No. 202080105849.9, dated Jul. 25, 2024, 12 pages of office action and no page of translation available.

"KI1: Update to Solution #3: Add support for UE leaving MBS", 3GPP TSG-WG SA2 Meeting #139E e-meeting, S2-2004699, Agenda Item: 8.9, Huawei, Jun. 1-12, 2020, pp. 1-4.

Office action received for corresponding European Patent Application No. 20753349.8, dated Aug. 2, 2024, 4 pages.

Office action received for corresponding European Patent Application No. 20754208.5, dated Aug. 13, 2024, 4 pages.

"3rd Generation Partnership Project; Technical Specification Group Radio Access Network; Nr; Nr and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Services and System Aspects; Study on architectural enhancements for 5G multicast-broadcast services (Release 17)", 3GPP TR 23.757, V0.4.0, Jun. 2020, pp. 1-157.

"Intelligent Transport Systems (ITS); Vehicular Communications; Basic Set of Applications; Part 3: Specifications of Decentralized Environmental Notification Basic Service", ETSI EN 302 637-3, V1.3.1, Apr. 2019, pp. 1-74.

"Further enhanced MTC for LTE", 3GPP TSG RAN meeting #74, RP-162283, Agenda Item: 10.4.15, Ericsson, Dec. 5-8, 2016, pp. 1-23.

Martín-Sacristán et al., "Low-latency V2X Communication Through Localized MBMS with Local V2X Servers Coordination", IEEE International Symposium on Broadband Multimedia Systems and Broadcasting (BMSB), Jun. 6-8, 2018, 8 pages.

International Search Report and Written Opinion received for corresponding Patent Cooperation Treaty Application No. PCT/EP2020/072187, dated Apr. 13, 2021, 9 pages.

International Search Report and Written Opinion received for corresponding Patent Cooperation Treaty Application No. PCT/EP2020/072099, dated Apr. 26, 2021, 17 pages.

Office action received for corresponding Japanese Patent Application No. 2023-507942, dated Nov. 18, 2024, 4 pages of office action and 2 pages of summary available.

Office action received for corresponding Chinese Patent Application No. 202080105849.9, dated Mar. 14, 2025, 10 pages of office action and no page of translation available.

* cited by examiner

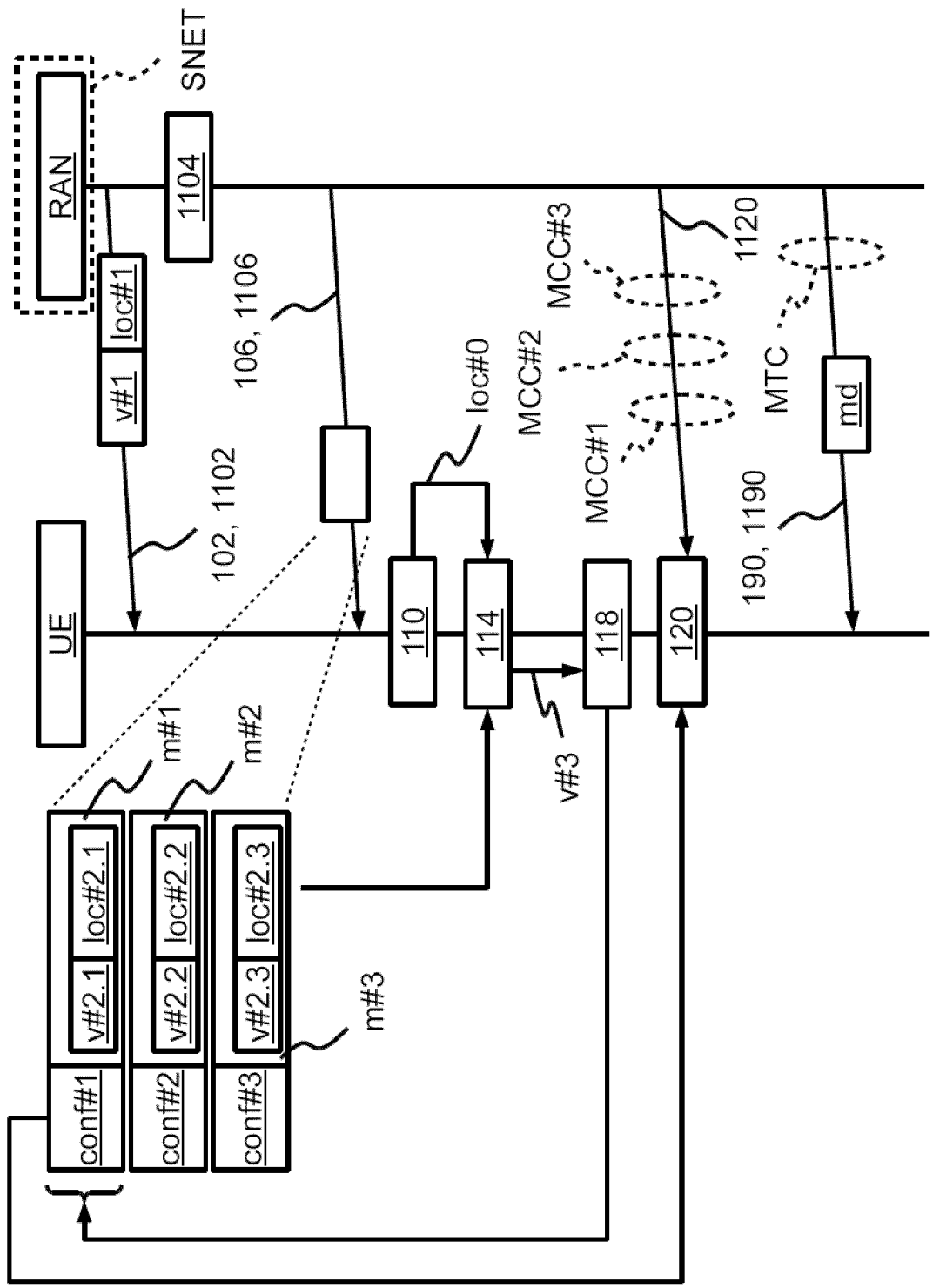

METHODS AND APPARATUSES FOR RADIO COMMUNICATION

RELATED APPLICATION

This application was originally filed as PCT Application No. PCT/EP2020/072187, filed on Aug. 6, 2020, which is incorporated herein by reference in its entirety.

FIELD OF THE INVENTION

Various example embodiments relate to enhancements for the provision of multicast sessions in radio networks.

BACKGROUND

Multicast sessions are provided to transmit multicast data to a plurality of UEs.

SUMMARY

According to a first aspect of the description, there is provided a method comprising receiving multicast data via a multicast transport channel that is associated with a plurality of multicast control channels, wherein at least one multicast control channel configuration of the multicast control channels is associated with at least one location indicator.

The provided scheme aims to support multicast services with different latency requirements at different geographical areas. In this regard, the scheme proposes to introduce multiple multicast control channels, for example SC-MCCHs, to configure a single multicast transport channel, for example SC-MTCH, where the multicast control channels are configured with an appropriately chosen modification period to support latency requirements within the respective geographical area. In addition, the solution proposes an ability at UEs to selectively monitor multicast control channel changes depending on the geographical area where UE is located with certain PDB/latency requirements that it is interested in for the given service.

Consequently, the scheme enables a multicast service provision with geographical-area dependent, different latency requirements. When moving from high to low latency regions or vice versa, the multicast service is configured via the at least one location indicator. Moreover, a change in multicast control channel configuration or multicast control channel does not affect UEs within the cell operating in a different location.

An advantageous example is characterized in that the method comprises: receiving a plurality of first QoS values and associated first location indicators; receiving a plurality of multicast control channel configurations comprising the at least one multicast control channel configuration, and associated matching information, the matching information comprising at least one second QoS value; determining a present location; selecting a QoS value from the plurality of first QoS values which associated first location indicator matches with the present location; selecting the at least one of the plurality of multicast control channel configurations which associated second QoS value matches with the selected QoS value; and monitoring the at least one multicast control channel associated with the multicast transport channel based on the selected at least one multicast control channel configuration.

An advantageous example is characterized in that, the method comprises receiving at least one first QoS value and at least one associated first location indicator; receiving a plurality of multicast control channel configurations and associated matching information, the matching information comprising at least one second QoS value and at least one associated second location indicator; determining a present location; determining a third QoS value from the at least one first QoS value if the present location matches the at least one first location indicator associated with the at least one first QoS value; selecting the at least one of the plurality of multicast control channel configurations which associated second QoS value matches with the determined third QoS value; and monitoring the at least one multicast control channel associated with the multicast transport channel based on the selected at least one multicast control channel configuration.

An advantageous example is characterized in that, the method comprises receiving at least one first group identifier and at least one associated first location indicator; receiving a plurality of multicast control channel configurations and associated matching information, the matching information comprising at least one second group identifier and at least one associated second location indicator; determining a present location; determining a third group identifier from the at least one first group identifier if the present location matches the at least one first location indicator associated with the at least one first group identifier; selecting the at least one of the plurality of multicast control channel configurations which associated second group identifier matches with the third group identifier; monitoring the at least one multicast control channel associated with the multicast transport channel based on the selected at least one multicast control channel configuration.

An advantageous example is characterized in that, the method comprises transmitting a join message requesting to join a multicast group; receiving, in response to the join message, a plurality of multicast control channel configurations and associated matching information, the matching information comprising at least one associated location indicator; determining a present location; selecting the at least one multicast control channel configuration from the plurality of multicast control configurations if the present location matches the at least one location indicator associated with the at least one multicast control channel configuration; and monitoring the at least one multicast control channel associated with the multicast transport channel based on the selected at least one multicast control channel configuration.

An advantageous example is characterized in that, the method comprises transmitting a join message requesting to join a multicast group; receiving, in response to the transmitted join message, the at least one first multicast control channel configuration; monitoring at least one first multicast control channel based on the received at least one first multicast control channel configuration.

An advantageous example is characterized in that, the method comprises receiving at least one second multicast control channel configuration and an associated location indicator via the monitored first multicast control channel; determining a present location; selecting the at least one second multicast control channel configuration if the present location matches the at least one location indicator associated with the at least one second multicast control channel configuration; monitoring at least one second multicast control channel associated with the multicast transport channel based on the at least one second multicast control channel configuration.

According to a second aspect of this description, there is provided a method comprising transmitting multicast data via a multicast transport channel associated with a plurality of multicast control channels, wherein at least one multicast control channel configuration of the multicast control channels is associated with at least one location indicator.

The provided scheme aims to support multicast services with different latency requirements at different geographical areas. In this regard, the scheme proposes to introduce multiple multicast control channels, for example SC-MCCHs, to configure a single multicast transport channel, for example SC-MTCH, where the multicast control channels are configured with an appropriately chosen modification period to support latency requirements within the respective geographical area. In addition, the solution proposes an ability at UEs to selectively monitor multicast control channel changes depending on the geographical area where UE is located with certain PDB/latency requirements that it is interested in for the given service.

Consequently, the scheme enables a multicast service provision with geographical-area dependent, different latency requirements. When moving from high to low latency regions or vice versa, the multicast service is configured via the at least one location indicator. Moreover, a change in multicast control channel configuration or multicast control channel does not affect UEs within the cell operating in a different location.

An advantageous example is characterized in that, the method comprises transmitting a plurality of first QoS values and associated first location indicators; determining a plurality of multicast control channel configurations and associated matching information, the matching information comprising at least one second QoS value; transmitting the plurality of multicast control channel configurations and the associated matching information; and transmitting control information via a plurality of multicast control channels based on the determined plurality of multicast control channel configurations.

An advantageous example is characterized in that, the method comprises transmitting at least one first QoS value and at least one associated first location indicator; determining a plurality of multicast control channel configurations comprising the at least one multicast control channel configuration, and associated matching information, the matching information comprising at least one second QoS value and at least one associated second location indicator; transmitting the plurality of multicast control channel configurations and the associated matching information; and transmitting control information via a plurality of multicast control channels based on the determined plurality of multicast control channel configurations.

An advantageous example is characterized in that, the method comprises transmitting at least one first group identifier and at least one associated first location indicator; determining a plurality of multicast control channel configurations comprising the at least one multicast control channel configuration, and associated matching information, the matching information comprising at least one second group identifier and at least one associated second location indicator; transmitting the plurality of multicast control channel configurations; and transmitting control information via a plurality of multicast control channels based on the determined plurality of multicast control channel configurations.

An advantageous example is characterized in that, the method comprises receiving a join message requesting to join a multicast group; determining a plurality of multicast control channel configurations comprising the at least one multicast control channel configuration and associated matching information, the matching information comprising at least one associated location indicator; transmitting, as a response to the join message, the plurality of multicast control channel configurations and the associated matching information; and transmitting control information via a plurality of multicast control channels based on the determined plurality of multicast control channel configurations.

An advantageous example is characterized in that, the method comprises receiving a join message requesting to join a multicast group; determining a present location of an apparatus from which the join message originates; determining at least one first multicast control channel configuration based on the determined present location; transmitting, in response to the received join message, the at least one first multicast control channel configuration; transmitting control information via the at least one first multicast control channel based on the determined at least one first multicast control channel configuration.

An advantageous example is characterized in that, the method comprises: determining a location indicator indicating a neighboring location of the present location; determining at least one second multicast control channel configuration based on the determined and associated location indicator; transmitting the at least one second multicast control channel configuration and the associated location indicator via the at least one first multicast control channel based on the determined at least one first multicast control channel configuration; transmitting further control information via at least one second multicast control channel based on the determined at least one second multicast control channel configuration.

According to a fourth aspect of the description, there is provided an apparatus comprising receiving means to receive multicast data via a multicast transport channel that is associated with a plurality of multicast control channels, wherein at least one multicast control channel configuration of the multicast control channels is associated with at least one location indicator.

According to a fifth aspect of the description, there is provided an apparatus comprising: transmitting means to transmit multicast data via a multicast transport channel associated with a plurality of multicast control channels, wherein at least one multicast control channel configuration of the multicast control channels is associated with at least one location indicator.

According to a sixth aspect of the description, there is provided an apparatus comprising: at least one processor, at least one memory including computer program code, and at least one communication module, the at least one memory and computer program code configured, with the at least one processor, and the at least one communication module, to cause the apparatus at least to: receive multicast data via a multicast transport channel that is associated with a plurality of multicast control channels, wherein at least one multicast control channel configuration of the multicast control channels is associated with at least one location indicator.

According to a sixth aspect of the description, there is provided an apparatus comprising: at least one processor, at least one memory including computer program code, and at least one communication module, the at least one memory and computer program code configured, with the at least one processor, and the at least one communication module, to cause the apparatus at least to: transmit multicast data via a multicast transport channel associated with a plurality of multicast control channels, wherein at least one multicast control channel configuration of the multicast control channels is associated with at least one location indicator.

BRIEF DESCRIPTION OF THE FIGURES

FIGS. 1, 3*a*, 3*b* and 4 to 6 each depict a schematic flow diagram;

DESCRIPTION OF THE EMBODIMENTS

Figure 1:
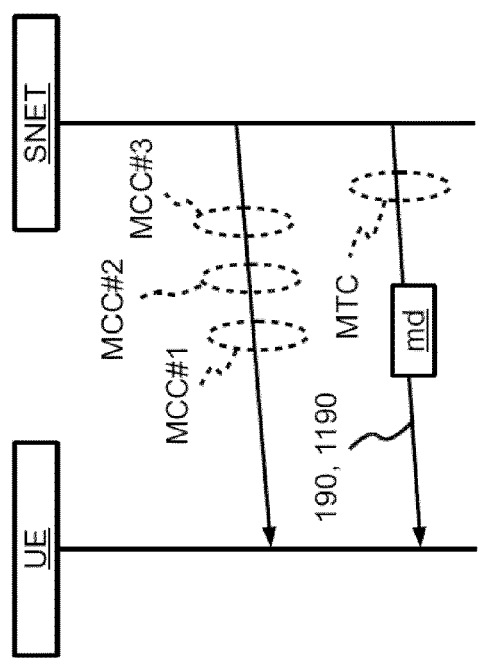

FIG. 1 depicts a schematic sequence diagram. An apparatus UE comprises receiving means or a receiving module to receive 190 multicast data md via a multicast transport channel MTC that is associated with a plurality of multicast control channels MCC#1 to MCC#3, wherein at least one multicast control channel configuration of the multicast control channels MCC#1 to MCC#3 is associated with at least one location indicator.

An apparatus SNET, RAN, 5GC, AF comprises transmitting means or a transmission module to transmit 1190 the multicast data md via the multicast transport channel MTC associated with the plurality of multicast control channels MCC#1 to MCC#3, wherein the at least one multicast control channel configuration of the multicast control channels MCC#1 to MCC#3 is associated with the at least one location indicator.

For example, when multiple SC-MCCH corresponding to single SC-MTCH are transmitted by the network, the apparatus UE needs to know which of the SC-MCCH it needs to acquire and monitor for a change to configure the SC-MTCH. The proposed scheme addresses this problem as follows. The apparatus RAN provides multiple SC-MCCHs where the SC-MCCHs are configured with different modification period to match service requirements at different geographical locations, e.g. Packet Delay Budget PDB of Quality of Service QoS. The apparatus UE selects which SC-MCCHs it acquires and monitors for a change notification by determining the interested SC-MCCH based on the geographical area where they are located and the associated PDB range or specific identifier provisioned to the apparatus UE, e.g. along with a session description such as User Service Description USD.

According to an example, for the apparatus UE in RRC_CONNECTED mode, multiple SC-MCCH configurations corresponding to different geographical areas for the service that the apparatus UE joins is provided over dedicated RRC signaling upon which the apparatus UE stores the received multicast control channel configuration and applies it also when the apparatus UE enters RRC_IDLE/INACTIVE and monitors the respective SC-MCCH depending on its location. The apparatus UE is in RRC_CONNECTED mode in order to send the join message.

According to an example, an SC-MCCH message sent on SC-MCCH comprises another SC-MCCH configuration of the other SC-MCCH channel. This allows, for example, SC-MCCH configuration new or updated for a neighboring area to be sent on SC-MCCH message enabling the apparatus UE to start the service with lower or higher latency when it moves to neighboring area.

In the following, different examples are presented to support a multicast service with different latency requirements at different geographical areas. The examples are applicable to scenarios in which 5G System 5GS is used to provide multicast and broadcast services to, for example, V2X applications with area dependent QoS requirements.

A QoS requirement comprises, represents and/or is a QoS value. A QoS value may take, for example, 5G QoS Identifier, QoS class identifier, any comparable identifier or an attribute describing Quality of Service such as, for example, latency or packet delay budget.

The provided scheme supports multicast services with geographical area-dependent different latency requirements by introducing multiple SC-MCCHs, associated with a single SC-MTCH for example, with different modification period to match the service requirements at different geographical areas. With this, low latency requirements at certain geographical areas e.g. intersection for V2X applications are supported with shorter modification period for the corresponding SC-MCCHs while continuing to support less constrained latency requirements at other geographical areas with properly chosen longer modification periods that do not require frequent monitoring of respective SC-MCCHs change.

For a given multicast service, the apparatus UE is configured to selectively monitor SC-MCCHs change depending on the geographical area, where the apparatus UE is located, with certain PDB/latency requirements that the apparatus UE is interested in. Hence, UEs in areas where the service multicast has less constrained latency requirements monitor SC-MCCH change less frequently and thus saving power. In addition, low latency requirements of the multicast service in certain areas are met by configuring those interested UEs to monitor the corresponding SC-MCCH change more frequently within such areas.

Figure 2:
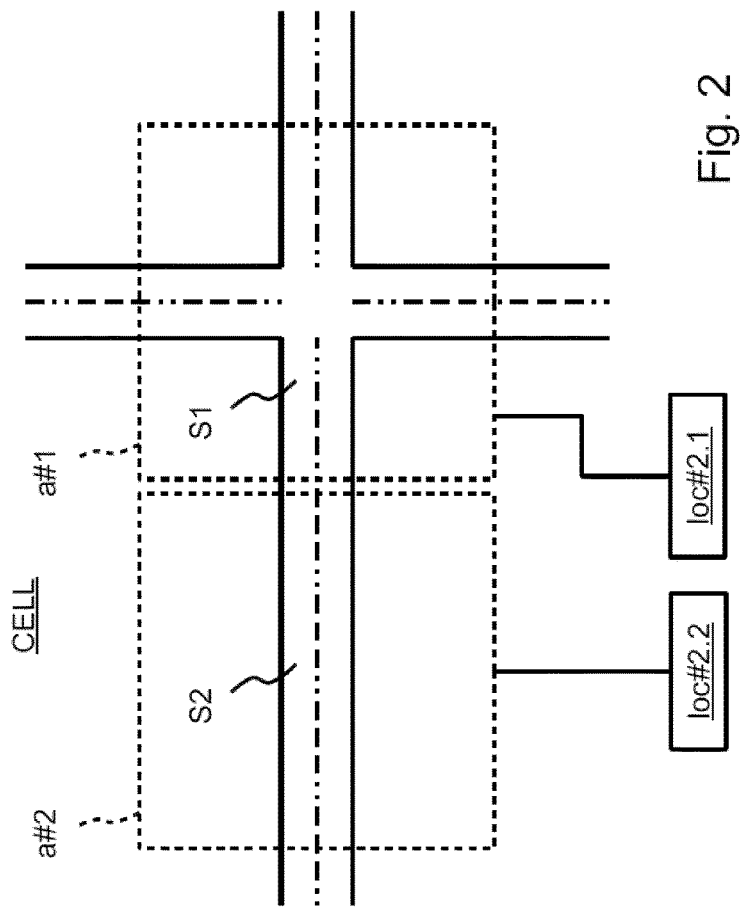
FIG. 2 schematically depicts a geographical area covered by a radio cell.

FIG. 2 shows a schematic map view of a street structure, which is located inside a radio cell CELL provided by the apparatus SNET of FIG. 1. The radio cell CELL contains two road sections S1 and S2 as shown in the example. The road section S1 comprises an intersection and is located in an area a#1 associated with a location indicator loc#2.1. The road section S2 does not comprise an intersection, but an intersection-free course of the road and is arranged in an area a#2 associated with a location indicator loc#2.2. In the intersection area, a traffic light system not shown is arranged, the signals of which are transmitted in the radio cell CELL via at least one multicast transport channel associated with one or a plurality of multicast control channels. The vehicles located in the area a#1 receive a multicast control channel with a higher scheduling frequency, whereas vehicles located in the area a#2 receive another multicast control channel with a lower scheduling frequency. Thus, vehicles in the area a#1 are able to receive changes of the received multicast control channel and thus changes of the assigned multicast transport channel with a higher frequency than in the area a#2.

A V2X service providing, for example, a status of the traffic light at the intersection, has geographically dependent QoS requirements. Another example of such V2X service is a warning message system in which various warning and emergency messages are disseminated to vehicles. The dissemination of a message is triggered when an event is detected. Vehicles are notified about the event and its cause in transmitted messages. Furthermore, it should be noted that the transmission of warning messages is typically repeated several times. If a broadcast channel such as SC-MTCH i.e. transport channel of SC-PTM is used to broadcast the messages, it can be understood that vehicles located nearer to an event location should be able to configure themselves for reception of a broadcast channel and being able to receive messages broadcast on the channel faster than vehicles located further from the event location leading to different service requirements depending on vehicle's position.

There are locations e.g. intersections that are known to have higher probability of events e.g. accidents than other locations e.g. straight sections of road on approaches to traffic junctions. These scenarios may lead to different service requirements in terms of how quickly a vehicle can tune to a broadcast channel e.g. SC-MTCH and receive messages. It should be also noted that it is desirable to use one broadcast channel to deliver notification or warning messages to vehicles because using more than one broadcast channel to deliver the substantially same data would lead to increased load in the cell which has a negative impact on interference consequently.

FIG. 3a depicts a schematic sequence diagram. The apparatus UE comprises receiving means or a receiving module to receive 102 at least one first QoS value v#1 and at least one associated first location indicator loc#1. Of course, also a plurality of pairs comprising the at least one first QoS value #v1 and the associated first location indicator loc#1 can be provided in form of a list of pairs.

The apparatus UE comprises receiving means or a receiving module to receive 106 a plurality of multicast control channel configurations conf#1, conf#2, conf#3 and associated matching information m#1, m#2, m#3, the matching information m#1, m#2, m#3 comprising at least one second QoS value v#2.1, v#2.2, v#2.3 and, optionally, at least one associated second location indicator loc#2.1, loc#2.2, loc#2.3.

The apparatus UE comprises determining means or a processing module to determine 110 a present location loc#0.

The apparatus UE comprises determining means or a processing module to determine 114 a third QoS value v#3 being valid for the present location from the at least one or a plurality of first QoS values v#1 if the present location loc#0 matches the at least one first location indicator loc#1 associated with the at least one first QoS value v#1.

The apparatus UE comprises selecting means or a processing module to determine 118 at least one of the plurality of multicast control channel configurations conf#1, conf#2, conf#3 which associated second QoS value v#2.1, v#2.2, v#2.3 matches with the determined third QoS value v#3. The apparatus UE comprises monitoring means or a processing module to monitor 120 at least one multicast control channel MCC#1 associated with the multicast transport channel MTC based on the selected at least one multicast control channel configuration conf#1.

The example supports latency bound reception of a multicast service with geographical area-dependent different latency requirements at the apparatus UE in RRC_IDLE or RRC_INACTIVE mode. Corresponding to a single SC-MTCH of an associated multicast service, the apparatus RAN broadcasts multiple SC-MCCHs in the sense of the multicast control channels MCC#1 to MCC#3 with different modification period in the sense of the configurations conf#1 to conf#3 and the associated PDB ranges in the sense of QoS values v#2.1 to v#2.3 that are valid for certain geographical area. In addition, the apparatus UE is provisioned with PDB in the sense of the first QoS value as well as the valid geographical area information in the sense of the first location indicator, both indicating the PDB requirement of the multicast service for a given geographical area. Based on the current location loc#0, the apparatus UE identifies the geographical area in which it is positioned and it can identify the PDB requirement of the service for the respective geographical area. Upon identifying the PDB for geographical area, the apparatus UE identifies and monitors the corresponding SC-MCCH associated with the PDB range that is broadcast from the apparatus RAN. Here, the PDB ranges may be broadcast in a SIB together with SC-MCCH configuration. According to another example, PDB ranges are broadcast in the content of SC-MCCH messages themselves, wherein the apparatus UE initially acquires the available SC-MCCH and then select the ones that should be monitored.

The apparatus UE is provisioned via USD containing QoS attributes and aggregated QoS requirements, or per media stream such as PDB, along with a geographical area validity information in the sense of the first location indicator loc#1. The first location indicator loc#1 is associated with the QoS attribute in the sense of the first QoS value v#1, indicating the geographical area in which the QoS attribute is valid. The apparatus RAN determines scheduling frequency of SC-MCCH, i.e. SC-MCCH modification period and SC-MCCH repetition period, based on associated 5G QoS Identifier 5QI, e.g. PDB range for different geographical area. Then, the apparatus RAN broadcasts the list of SC-MCCHs and the associated PDB range via a SIB message, which comprises list of SC-MCCHs with the corresponding PDB range for different geographical area for the associated multicast service.

Based on the provisioned QoS attributes e.g. PDB and associated geographical area information, the apparatus UE determines the PDB range for the multicast service within the geographical area by matching its location loc#0 with the location indicators loc#2.1 to loc#2.3. With the PDB range determined, the apparatus UE determines which SC-MCCH to monitor by matching the locally determined PDB for the geographical area with the PDB associated with SC-MCCHs. In case, the QoS attributes in the sense of the at least one or a plurality of QoS values v#1 provisioned do not match with 5GS 5QI e.g. PDB, then the apparatus UE performs an mapping of the first QoS value v#1 to 5GS 5QI. Thereafter, the apparatus UE monitors the selected SC-MCCHs for a modification indication or respective SC-MCCH change as long as the apparatus UE is in the corresponding valid geographical area.

The apparatus RAN comprises transmitting means or a transmission module to transmit 1102 the at least one first QoS value v#1 and at least one associated first location indicator loc#1.

The apparatus RAN comprises determining means or a processing module to determine 1104 the plurality of multicast control channel configurations conf#1, conf#2, conf#3 and associated matching information m#1, m#2, m#3, the matching information m#1, m#2, m#3 comprising at least one second QoS value v#2.1, v#2.2, v#2.3 and optionally, at least one associated second location indicator loc#2.1, loc#2.2, loc#2.3.

The apparatus RAN comprises transmitting means or a transmission module to transmit 1106 the plurality of multicast control channel configurations conf#1, conf#2, conf#3 and the associated matching information m#1, m#2, m#3.

The apparatus RAN comprises transmitting means or a transmission module to transmit 1120 control information via the plurality of multicast control channels MCC#1, MCC#2, MCC#3 based on the determined plurality of multicast control channel configurations conf#1, conf#2, conf#3.

Figure 3B:
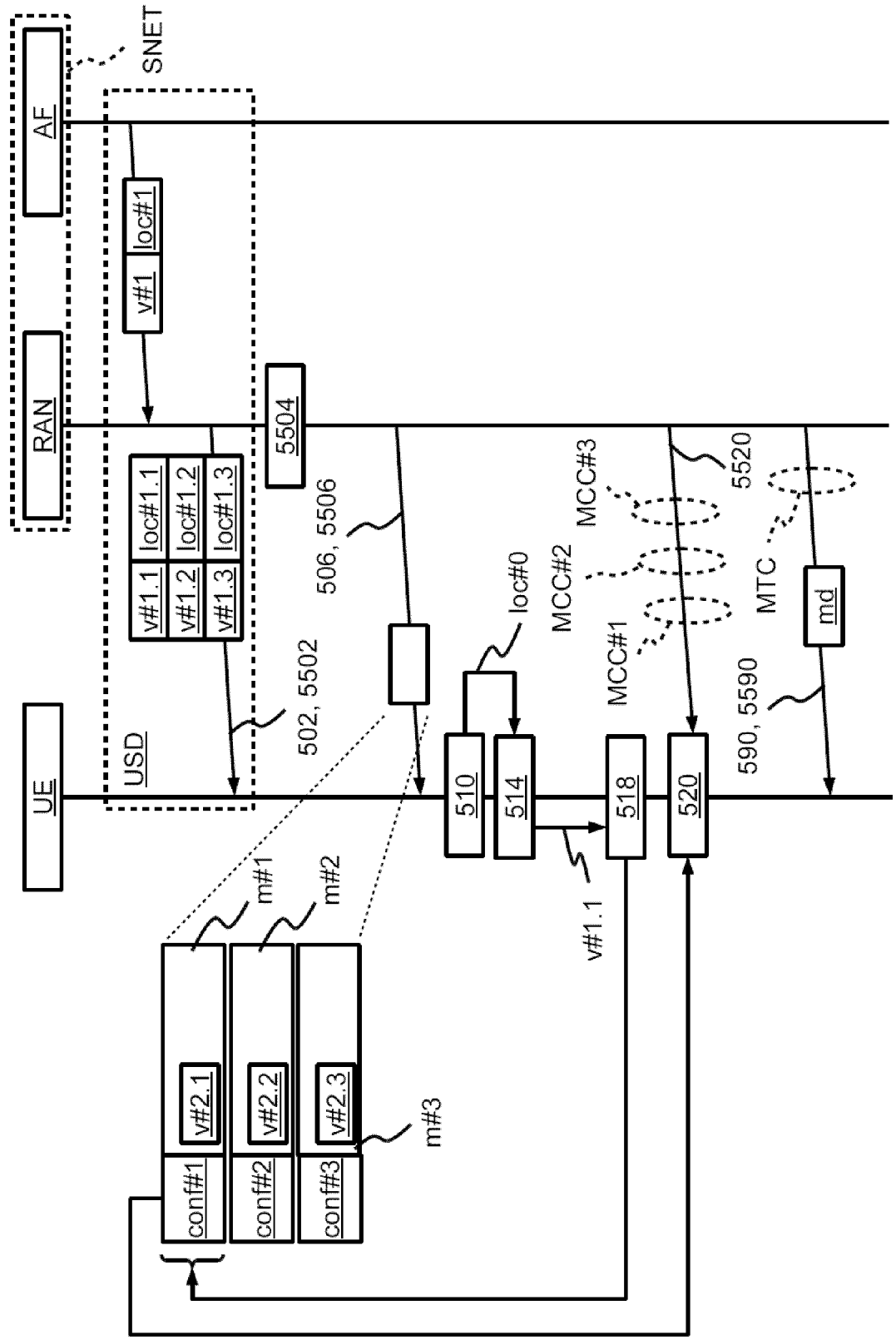

FIG. 3b depicts a schematic sequence diagram. According to this example, the second location indicator loc#2.1, loc#2.2, loc#2.3 of FIG. 3a is not provided as part of the matching information m#1, m#2, m#3.

The apparatus RAN is aware of the fact that a multicast session is associated with more than one QoS value v#2.1, v#2.2 and v#2.3 but it has no information about geographical locations where these values are valid. The geographical location is known by an apparatus AF representing an application function and the geographical location information in form of the location indicator loc#1 is provisioned to the apparatus UE together with the associated QoS value v#1.

USD includes a list of QoS values v#1.1, v#1.2, v#1.3 and location indicators loc#1.1, loc#1.2 loc#1.3. The apparatus UE determines 114 the matching QoS value v#3 by matching its location loc#0 with associated received location indicator loc#1.1, given the case that loc#1.1 matches loc#0. In the former case v#3 equals v#1.1.

The apparatus UE then selects 118 the multicast control channel configuration conf#1 by searching for the match of v#3 with at least one v#2.1, v#2.2 and v#2.3 and selecting the multicast channel configuration conf#1 which is associated with the matched value.

The apparatus UE comprises receiving means or a reception module to receive 502 a plurality of first QoS values v#1.1, v#1.2, v#1.3 and associated first location indicators loc#1.1, loc#1.2, loc#1.3.

The apparatus UE comprises receiving means or a reception module 506 to receive a plurality of multicast control channel configurations conf#1, conf#2, conf#3, the plurality of multicast channel configurations conf#1, conf#2, conf#3 comprising the at least one multicast control channel configuration (conf#1, conf#2, conf#3), and associated matching information m#1, m#2, m#3, the matching information m#1, m#2, m#3 comprising at least one second QoS value v#2.1, v#2.2, v#2.3.

The apparatus UE comprises determining means or a processing module to determine 510 a present location loc#0 of the apparatus UE.

The apparatus UE comprises selecting means or a processing module to select 514 a QoS value v#1.1 from the plurality of first QoS values v#1.1, v#1.2, v#1.3 which associated first location indicator loc#1.1 matches with the determine present location loc#0.

The apparatus UE comprises selecting means or a processing module to select 518 at least one of the plurality of multicast control channel configurations conf#1, conf#2, conf#3 which associated second QoS value v#2.1, v#2.2, v#2.3 matches with the selected QoS value v#1.1.

The apparatus UE comprises monitoring means or a processing module to monitor 520 the at least one multicast control channel MCC#1, MCC#2, MCC#3 associated with the multicast transport channel MTC based on the selected at least one multicast control channel configuration conf#1, conf#2, conf#3.

The apparatus RAN comprises transmitting means or a transmission module to transmit 5502 the plurality of first QoS values v#1.1, v#1.2, v#1.3 and associated first location indicators loc#1.1, loc#1.2, loc#1.3.

The apparatus RAN comprises determining means or a processing module to determine 5504 a plurality of multicast control channel configurations conf#1, conf#2, conf#3 and associated matching information m#1, m#2, m#3, the matching information m#1, m#2, m#3 comprising at least one second QoS value v#2.1, v#2.2, v#2.3.

The apparatus RAN comprises transmitting means or a transmission module to transmit 5506 the plurality of multicast control channel configurations conf#1, conf#2, conf#3 and the associated matching information m#1, m#2, m#3.

The apparatus RAN comprises transmitting means or a transmission module to transmit 5520 control information via the plurality of multicast control channels MCC#1, MCC#2, MCC#3 based on the determined plurality of multicast control channel configurations conf#1, conf#2, conf#3.

Figure 4:
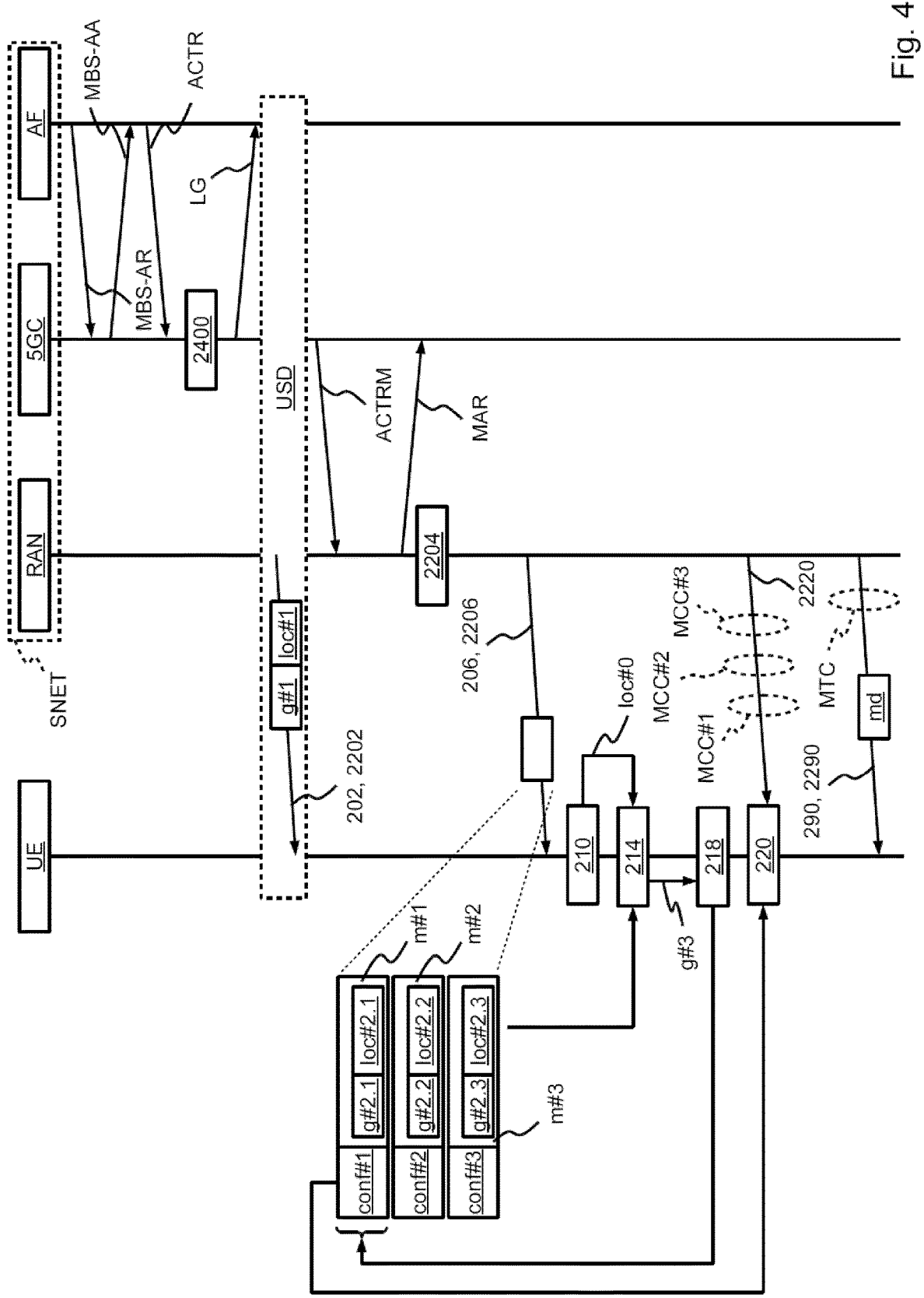

FIG. 4 depicts a schematic sequence diagram. An MBS service allocation request MBS_AR, for example a TMGI allocation request, is transmitted from an apparatus AF representing an Application Function, to an apparatus 5GC, representing 5G core. The apparatus AF response the received MBS service allocation request MBS_AR with an MBS service allocation response MBS_AA, for example a TMGI allocation request response.

With an MBMS activation request ACTR, the apparatus AF informs an apparatus 5GC of the QoS requirement of the at least one multicast service for different geographical areas by providing a list of QoS values with associated geographical area information in the sense of the location indicator loc#1.

Depending on the QoS requirement, the apparatus 5GC allocates 2400 a Config Group ID in the sense of the group identifiers g#2.1 to g#2.3 for geographical areas with comparable QoS requirements and provides them along with QoS values as a list LG to the apparatus RAN via an activation request message ACTRM, for example an MBS activation request. The apparatus RAN transmits an MBS activation response MAR as a response to the received activation request message ACTRM.

Alternatively, the allocation 2400 involves the apparatus RAN so that the apparatus 5GC asks the apparatus RAN to allocate the Config Group IDs in the sense of the group identifiers g#2.1 to g#2.3 since the apparatus RAN is responsible for determining SC-MCCH scheduling. Upon determining the Config Group IDs in the sense of the group identifiers g#2.1 to g#2.3 for different geographical areas depending on QoS requirements, the apparatus 5GC provides these group identifiers g#2.1 to g#2.3 with geographical area validity information in the sense of the location identifier loc#1 to the apparatus AF and subsequently, the apparatus AF provisions the at least one group identifier g#1 and the associated location identifier loc#1 in USD to the apparatus UE to cause the apparatus UE to monitor corresponding SC-MCCHs in the indicated geographical area.

The apparatus RAN determines the scheduling frequency of SC-MCCH, i.e. SC-MCCH modification period, for multicast services with an associated group identifier g#2.1 to g#2.3 based on QoS requirements. An SIB comprising a list of SC-MCCHs with corresponding group identifiers g#2.1 to g#2.3 is broadcast.

Based on the provisioned group identifiers g#2.1 to g#2.3 and the associated geographical area-dependent validity information in the sense of the location indicators loc#2.1 to loc#2.3, the apparatus UE determines the valid group identifier g#2.1 within the geographical area by matching its location in the sense of the location indicator loc#0 with the location indicators loc#2.1 to loc#2.3 and by matching the group identifier g#3 identified in step 214 with the provisioned group identifiers g#2.1 to g#2.3.

In the received SIB the apparatus UE searches for SC-MCCH matching the associated group identifier g#2.1 to g#2.3 in SIB with the group identifier g#3 identified in step 214. If a matching group identifier g#2.1 is found, the apparatus UE monitors 220 the corresponding SC-MCCH as long as the apparatus UE is in the respective geographical area indicated via the location indicator loc#2.1. The location indicator loc#1 is substantially the same as the location indicator loc#2.1.

The apparatus UE comprises receiving means to receiving module to receive 202 at least one first group identifier g#1 and at least one associated first location indicator loc#1.

The apparatus UE comprises receiving means or a receiving module to receive 206 the plurality of multicast control channel configurations conf#1, conf#2, conf#3 and associated matching information m#1, m#2, m#3, the matching information m#1, m#2, m#3 comprising at least one second group identifier g#2.1, g#2.2, g#2.3 and, optionally, at least one associated second location indicator loc#2.1, loc#2.2, loc#2.3.

The apparatus UE comprises determining means or a processing module to determine 210 a present location loc#0 of the apparatus UE.

The apparatus UE comprises determining means or a processing module to determine 214 a third group identifier g#3 from the at least one first group identifier g#1 if the present location loc#0 matches the at least one first location indicator loc#1 associated with the at least one first group identifier g#1. The third group identifier g#3 is the first group identifier g#1 if a match happens.

The apparatus UE comprises selecting means or a processing module to select 218 at least one of the plurality of multicast control channel configurations conf#1, conf#2, conf#3 which associated second group identifier g#2.1 matches with the third group identifier g#3.

The apparatus UE comprises monitoring means or a processing module to monitor 220 at least one multicast control channel MCC#1 associated with the multicast transport channel MTC based on the selected at least one multicast control channel configuration conf#1.

The apparatus RAN comprises transmitting means or a transmission module to transmit 2202 at least one first group identifier g#1 and at least one associated first location indicator loc#1.

The apparatus RAN comprises determining means or a processing module to determine 2204 the plurality of multicast control channel configurations conf#1, conf#2, conf#3 and associated matching information m#1, m#2, m#3, the matching information m#1, m#2, m#3 comprising at least one second group identifier g#2.1, g#2.2, g#2.3 and, optionally, at least one associated second location indicator loc#2.1, loc#2.2, loc#2.3.

The apparatus RAN comprises transmitting means or a transmission module to transmit 2206 the plurality of multicast control channel configurations conf#1, conf#2, conf#3 and associated matching information m#1, m#2, m#3. The apparatus RAN comprises transmitting means or a transmission module to transmit 2220 control information via the plurality of multicast control channels MCC based on the determined plurality of multicast control channel configurations conf#1, conf#2, conf#3.

Therefore, the apparatus UE is provisioned with at least one of a first group identifiers g#1 together with geographical area validity information in the sense of the location identifier loc#1 the via USD, in order to indicate the SC-MCCH that the apparatus UE is caused to monitor in the associated geographical area, thereby supporting latency bound reception of the respective multicast service in different areas.

Figure 5:
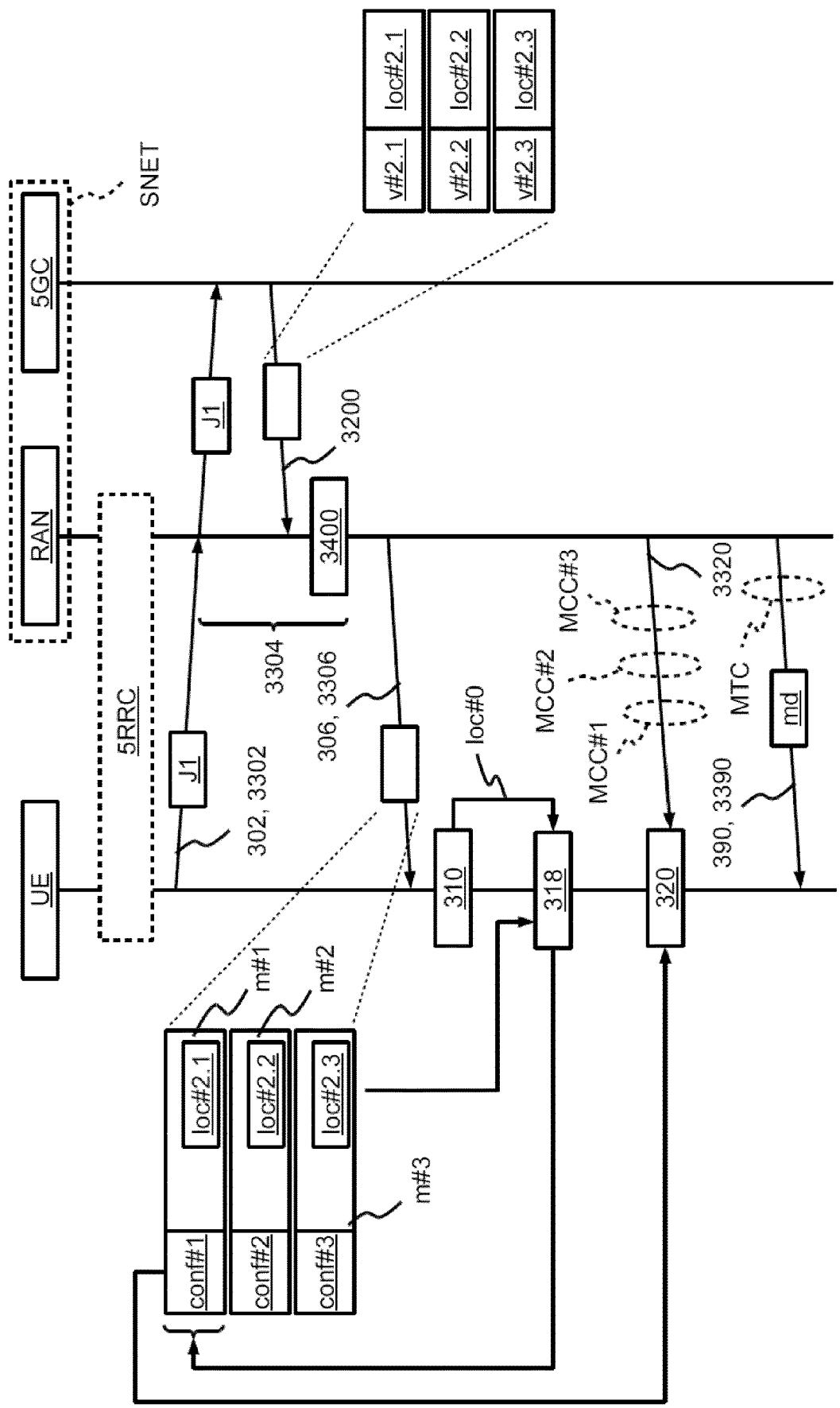

FIG. 5 depicts a schematic sequence diagram. According to block 5RRC, an RRC connection is established for the apparatus UE.

The apparatus UE comprises transmitting means or a transmission module to transmit 302 a join message J1 requesting to join a multicast group.

The apparatus RAN comprises receiving means or a receiving module to receive 3302 the join message J1 requesting to join the multicast group.

The apparatus RAN comprises determining means or a processing module to determine 3304 a plurality of multicast control channel configurations conf#1, conf#2, conf#3 and associated matching information m#1, m#2, m#3, the matching information m#1, m#2, m#3 comprising at least one associated location indicator loc#2.1, loc#2.2, loc#2.3. The determination 3304 comprises an interaction with apparatus 5GC.

When the apparatus UE is caused to join a multicast group e.g. by sending Internet Group Management Protocol IGMP/Multicast Listener discovery Protocol MLD join, or a control plane signaling with the apparatus 5GC in RRC_CONNECTED mode, the list of SC-MCCH configurations in the sense of the multicast control channel configurations with appropriately chosen area-dependent different modification periods for the multicast service that apparatus UE joins is provided over dedicated RRC signaling. Thereafter, the apparatus UE stores the received multicast control channel configuration conf#1, applies the configuration conf#1 upon entering RRC_IDLE or RRC_INACTIVE mode, and monitors 220 the respective SC-MCCH change for the geographical area based on its location loc#0.

The apparatus UE is assumed to have established RRC connection with RAN. The apparatus UE joins a multicast session with different latency requirements at different geographical areas. Subsequently, the apparatus 5GC transmits 3200 the list of QoS values v#2.1 to v#2.3 for the multicast service with geographical area validity information in the sense of associated location indicators loc#2.1 to loc#2.3 for the respective QoS value v#2.1 to v#2.3 in a PDU Session Modification message to the apparatus RAN.

In order to meet the latency requirement of the multicast services in different geographical areas, the apparatus RAN appropriately chooses 3400 a plurality SC-MCCH configurations for the multicast service and provides this list of SC-MCCHs with the location indicators loc#2.1 to loc#2.3 to the apparatus UE i.e., for example, a first SC-MCCH configuration for a first area and a second SC-MCCH configuration for second area, with properly chosen different modification periods. Subsequently, the apparatus UE enters RRC_IDLE/RRC_INACTIVE mode and monitors 320 the selected SC-MCCH avoiding monitoring other SC-MCCH.

The apparatus RAN comprises transmitting means or a transmission module to transmit 3306, as a response to the join message J1, the plurality of multicast control channel configurations conf#1, conf#2, conf#3 and the associated matching information m#1, m#2, m#3.

The apparatus UE comprises receiving means or a reception module to receive 306, in response to the join message J1, the plurality of multicast control channel configurations conf#1, conf#2, conf#3 and associated matching information m#1, m#3, m#3, the matching information m#1, m#2, m#3 comprising at least one associated location indicator loc#2.1, loc#2.2, loc#2.3.

The apparatus UE comprises determining means or a processing module to determine 310 a present location loc#0.

The apparatus UE comprises selecting means or a processing module to select 318 at least one multicast control channel configuration conf#1 from the plurality of multicast control configurations conf#1, conf#2, conf#3 if the present location loc#0 matches the at least one location indicator loc#2.1 associated with the at least one multicast control channel configuration conf#1.

The apparatus UE comprises monitoring means or a processing module to monitor 320 at least one multicast control channel MCC#1 associated with the multicast transport channel MTC based on the selected at least one multicast control channel configuration conf#1.

The apparatus UE determines 318 what SC-MCCH to monitor by matching its location loc#0 with the geographical area validity information in the sense of the location indicators loc#2.1 to loc#2.3 associated with the configurations conf#1 to conf#3. If there is a valid SC-MCCH or a valid configuration conf#1 to conf#3 for the given UE location i.e. if the UE location is within valid area given in the location indicators loc#2.1 to loc#2.3, the apparatus UE monitors 390 the corresponding SC-MCCH as long at the apparatus UE is within the respective geographical area.

Figure 6:
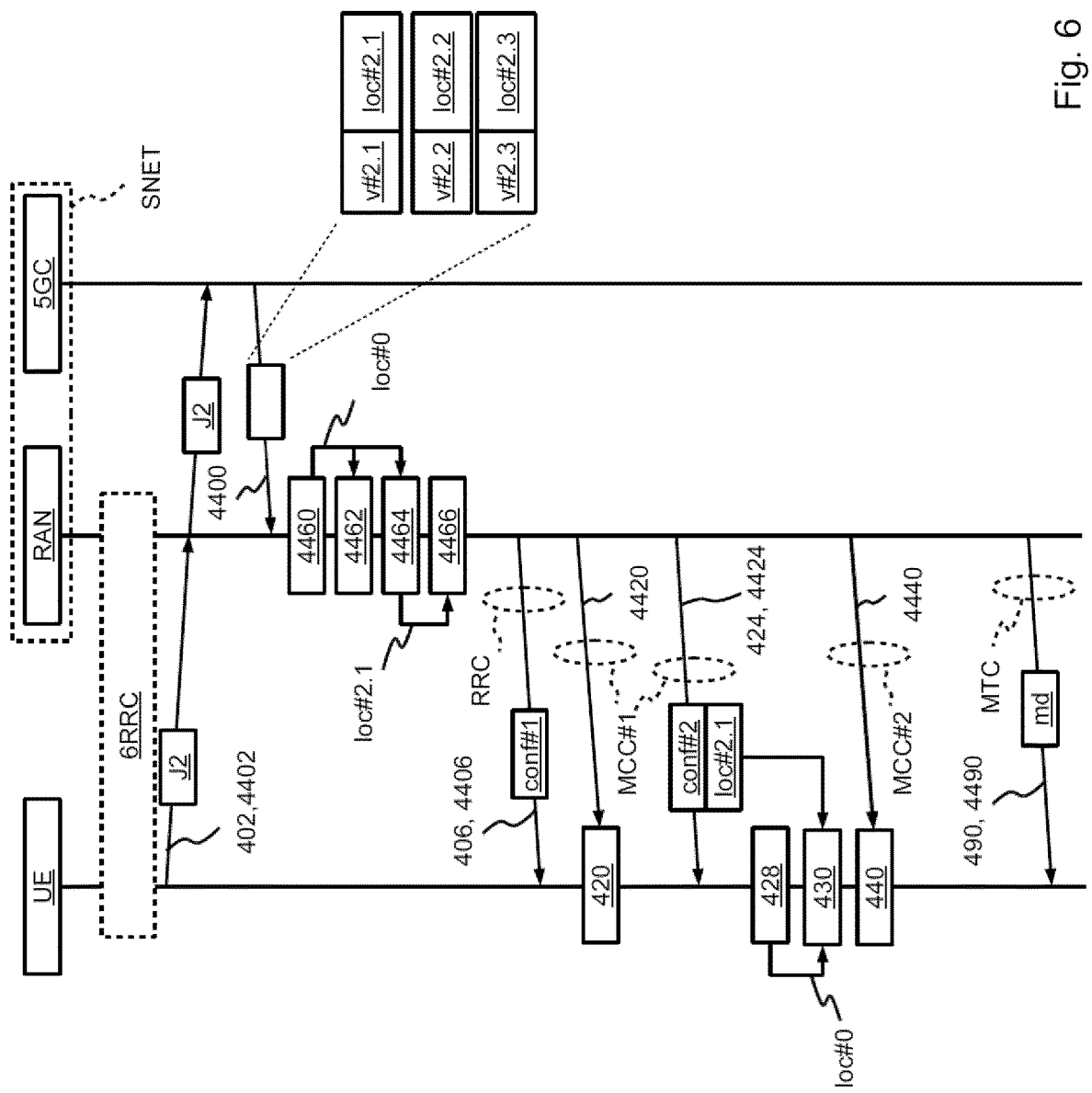
Figure 8:
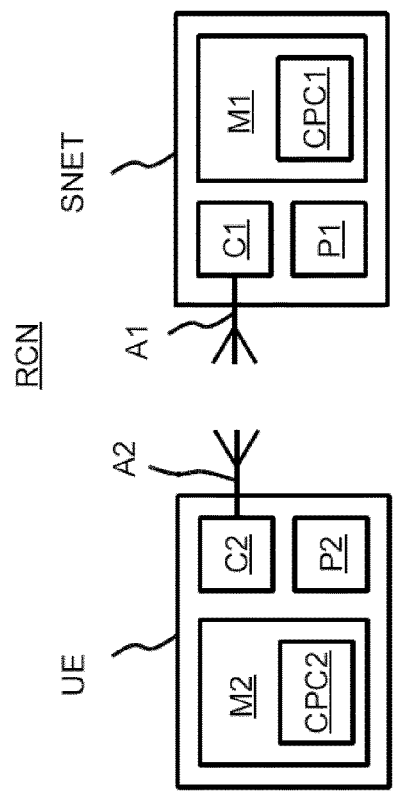
FIG. 8 schematically depicts a radio communications network.

The apparatus RAN comprises transmitting means or a transmission module to transmit 3320 control information via a plurality of multicast control channels MCC#1, MCC#2, MCC#3 based on the determined plurality of multicast control channel configurations conf#1, conf#2, conf#3. FIG. 6 depicts a schematic sequence diagram. According to block 6RRC, an RRC connection is established for the apparatus UE.

The apparatus UE comprises transmitting means or a transmission module to transmit 402 a join message J2 requesting to join a multicast group.

The apparatus RAN comprises receiving means or a reception module to receive 4402 the join message J2 requesting to join the multicast group. The join message J2 is passed to the apparatus 5GC.

The apparatus UE is assumed to have established RRC connection with RAN. The apparatus UE joins a multicast session with different latency requirements at different geographical areas. Subsequently, the apparatus 5GC transmits 4400 the list of QoS values for the multicast service with geographical area validity information in the sense of the location indicators loc#2.1 to loc#2.3 and the associated QoS values v#2.1 to v#2.3 in a PDU Session Modification message.

The apparatus RAN determines 4460 the location loc#0 of the apparatus and provides 4406 to the apparatus UE the at least one SC-MCCH configuration with the appropriately chosen modification period based on the QoS value v#2.1 of the area corresponding to the location loc#0. In addition, to meet the latency requirement in neighboring areas of the apparatus UE, the apparatus RAN includes at least one SC-MCCH configurations with appropriately chosen modification periods for neighboring areas in the SC-MCCH message in step 4406. That is, let a first SC-MCCH configuration be the configuration for SC-MCCH channel in a first area where the apparatus UE is currently located, and let the second SC-MCCH configuration be the configuration for the second SC-MCCH channel in a neighboring second area. Then, the apparatus RAN transmits the second SC-MCCH configuration with the location indicator loc#2.1 in the SC-MCCH message of the first SC-MCCH. This allows the apparatus UE to enter RRC_IDLE/RRC_INACTIVE mode upon receiving the first SC-MCCH configuration in the first area and continue to monitor appropriate SC-MCCH depending on location of the apparatus UE.

The apparatus RAN comprises determining means or a processing module to determine 4460 a present location loc#0 of an apparatus UE from which the join message J2 originates.

The apparatus RAN comprises determining means or a processing module to determine 4462 at least one first multicast control channel configuration conf#1 based on the determined present location 4462.

The apparatus RAN comprises transmitting means or a transmission module to transmit 4406, in response to the received join message J2, the at least one first multicast control channel configuration conf#1 via RRC signaling.

The apparatus RAN comprises transmitting means or a transmission module to transmit 4420 control information via the at least one first multicast control channel MCC#1 based on the determined at least one first multicast control channel configuration conf#1.

The apparatus RAN comprises determining means or a processing module to determine 4464 a location indicator loc#2.1 indicating a neighboring location of the present location loc#0.

The apparatus UE comprises receiving means or a reception module to receive 406, in response to the transmitted join message J2, at least one first multicast control channel configuration conf#1.

The apparatus UE comprises monitoring means or a processing module to monitor 420 at least one first multicast control channel MCC#1 based on the received at least one first multicast control channel configuration conf#1.

When the apparatus UE is caused to join a multicast group e.g. by sending Internet Group Management Protocol IGMP/Multicast Listener discovery Protocol MLD join, or a control plane signaling with apparatus 5GC in RRC_CONNECTED mode, the apparatus RAN determines the location of the apparatus UE and provides SC-MCCH configuration of SC-MCCH for the area corresponding to that determined location by taking into account the QoS requirement of the multicast service within the area. In addition, SC-MCCH message sent from RAN on SC-MCCH channel for this area is proposed to include information about SC-MCCH in neighboring areas. Thus, when the apparatus UE decodes SC-MCCH based on the multicast control channel configuration it received from the network, it also receives the other at least one SC-MCCH configuration for SC-MCCH channels in neighboring areas. Thereafter, the apparatus UE stores the received multicast control channel configuration, applies the configuration upon entering RRC_IDLE or RRC_INACTIVE mode, and monitors the respective SC-MCCH change for the geographical area based on its location.

The apparatus UE comprises receiving means or a reception module to receive 424 at least one second multicast control channel configuration conf#2 and an associated location indicator loc#2.1 via the monitored first multicast control channel MCC#1.

The apparatus UE comprises determining means or a processing module to determine 428 a present location loc#0.

The apparatus UE comprises selecting means or a processing module to select 430 the at least one second multicast control channel configuration conf#2 if the present location loc#0 matches the at least one location indicator loc#2.1 associated with the at least one second multicast control channel configuration conf#2.

The apparatus UE comprises monitoring means or a processing module to monitor 440 at least one second multicast control channel MCC#2 associated with the multicast transport channel MTC based on the at least one second multicast control channel configuration conf#2.

The apparatus RAN comprises determining means or a processing module to determine 4466 at least one second multicast control channel configuration conf#2 based on the determined and associated location indicator loc#2.1.

The apparatus RAN comprises transmitting means or a transmission module to transmit 4424 the at least one second multicast control channel configuration conf#2 and the associated location indicator loc#2.1 via the at least one first multicast control channel MCC#1 based on the determined at least one first multicast control channel configuration conf#1.

The apparatus RAN comprises transmitting means or a transmission module to transmit 4440 further control information via at least one second multicast control channel MCC#2 based on the determined at least one second multicast control channel configuration conf#2.

Accordingly, an SC-MCCH message sent on SC-MCCH comprises another SC-MCCH configuration of another SC-MCCH channel as well. For example, when a second SC-MCCH configuration for a second area is modified from longer to shorter modification period, the SC-MCCH message sent on the first SC-MCCH with shorter modification period for the first area contains the second SC-MCCH configuration allowing the apparatus UE in the first area to receive and update the second SC-MCCH configuration. With this, when the apparatus UE moves from the first area to the second area, the apparatus is able to start the multicast service with a lower latency in the second area.

The apparatus UE receives and decodes, therefore monitors 420, the first SC-MCCH based on the first SC-MCCH configuration received 406. The first SC-MCCH provides control information to the apparatus UE about the second SC-MCCH in the neighboring area, that is, the second SC-MCCH configuration along with the second location indicator loc#2.1. With this information, the apparatus UE monitors 420 the first SC-MCCH change until it enters the second area and upon entering the second area, the apparatus UE starts monitoring the second SC-MCCH change as per the second SC-MCCH configuration.

Figure 7:
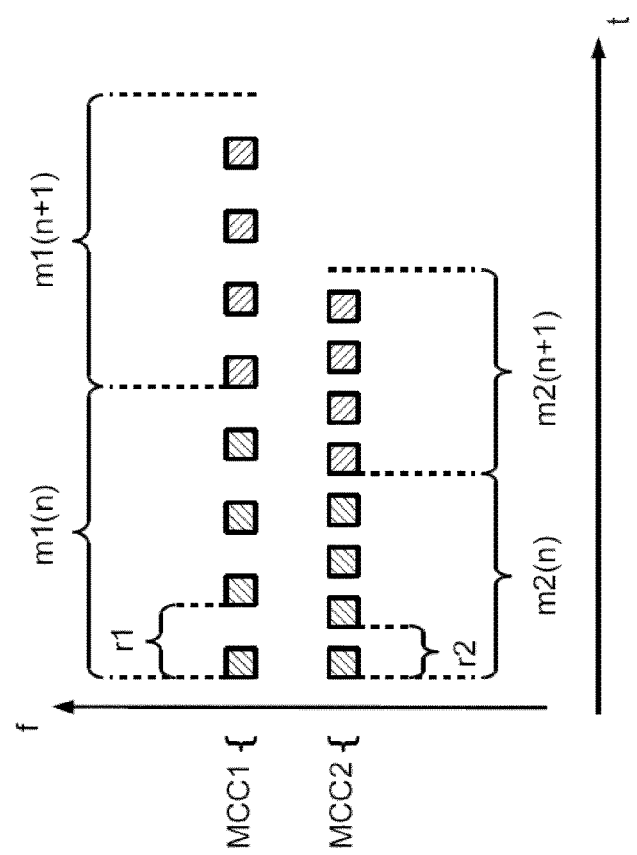
FIG. 7 schematically depicts a time-frequency diagram.

FIG. 7 depicts schematically a time-frequency diagram. The multicast control channels MCC1 and MCC2 their different configurations are shown.

The SC-MCCH information, i.e. information transmitted in messages sent over one of the multicast control channels MCC1 and MCC2, at least one being for example a SC-MCCH, carries SC-PTM configuration information and is transmitted periodically, using a configurable repetition period r1, r2, which are different in the shown example. The configurable modification periods m1, m2 are used for changing SC-MCCH information which restricts the occurrences of such changes to specific radio frames. Modification periods m1, m2 comprise a fixed number of radio frames within which the substantially same SC-MCCH information may be transmitted several times, as defined by its scheduling based on the repetition period r1, r2. For modification period m1, m2 consisting of a number x of radio frames, the modification period boundaries are, for example, defined by System Frame Number SFN values for which SFN mod x=0. The content of the multicast control channels MCC1 and MCC2 and thus an announcement of a new service or suspension of an active service occurs at the boundaries of the SC-MCCH modification periods m1, m2. During the first modification period m1(n), m2(n), change notifications are transmitted via the multicast control channel MCC1, MCC2. During the subsequent second modification m1(n+1), m2(n+1), updated information is transmitted via the respective multicast control channel MCC1, MCC2.

The modification periods m1, m2 define, for example, periodically appearing boundaries, i.e. radio frames for which SFN mod sc-mcch-ModificationPeriod=zero. According to an example, the contents of different transmissions of MCC1 or MCC2 information is different if there is at least one such boundary in-between them.

In order to announce changes of the respective multicast control channel MCC1, MCC2 to UEs due to, for example, session start or session suspension, notification mechanism is used. Upon change notification in nth modification period m1(n), m2(n), the update of the multicast radio control channel MCC1, MCC2 takes place in (n+1)th modification period m1(n+1), m2(n+1) as illustrated. The UE acquires the respective MCC1, MCC2 since the substantially same subframe in which a change notification is received.

When the network changes some of the MCC1, MCC2 information, it notifies the UEs about the change in the first subframe that can be used for MCC1, MCC2 transmission in a repetition period r1, r2. LSB bit in 8-bit bitmap when set to '1' indicates the change in MCC1, MCC2. Upon receiving a change notification, a UE interested to receive MBMS services transmitted using SC-PTM acquires the new SC-MCCH information starting from the substantially same subframe. The UE applies the previously acquired MCC1, MCC2 information until the UE acquires the new MCC1, MCC2 information.

There is a plurality of multicast control channels MCC1, MCC2 that carry SC-PTM configuration information to provide SC-MTCHs configuration for multicast services. The modification period can be configured for the respective multicast control channel MCC1 and MCC2 in order to meet the latency requirements of the multicast services and/or multicast sessions. If there are multicast services with low latency requirements e.g. mission critical services, modification period m1, m2 is configured to be shorter allowing UEs to monitor changes of the MCC1, MCC2 more frequently and to acquire the new MCC1, MCC2 with low latency.

FIG. 7 schematically depicts a radio communications network RCN. The apparatus SNET, UE comprises at least one processor P1, P2, at least one non-volatile memory M1, M2 including computer program code CPC1, CPC2 and at least one communication module C1, C2 that is coupled with at least one antenna A1, A2. The at least one memory M1, M2 and computer program code CPC1, CPC2 are configured, with the at least one processor P1, P2, and the at least one communication module or communication means C1, C2 to cause the apparatus SNET, UE at least to operate according to the present description. The apparatuses SNET and UE communicate via dedicated radio channels. The apparatus SNET may comprise the apparatus RAN as that of FIG. 3 or may comprise the further apparatuses RAN, 5GC and AF as that of FIG. 4 or may comprise the apparatuses RAN and 5GC at that of FIG. 5, for example.

Certain abbreviations that may be found in the description and/or in the figures are herewith defined as follows:
5GC 5G Core
5GS 5G System
5QI 5G QoS Identifier
3GPP 3rd Generation Partnership Project
AF Application Function
gNB Next Generation NodeB
IGMP Internet Group Management Protocol
LTE Long-Term Evolution MBB Mobile Broadband
MBMS Multimedia Broadcast/Multicast Service
MCC Mission Critical Communication
MIB Master Information Block
MLD Multicast Listener discovery Protocol
NR New Radio
PDB Packet Delay Budget
PDU Packet Data Unit
PRACH Physical Random Access Channel
QoS Quality of Service
RAN Radio Access Network
SC-MCCH Single Cell Multicast Control Channel
SC-MRB Single Cell MBMS Point to Multipoint Radio Bearer
SC-MTCH Single Cell Multicast Transport Channel
SC-PTM Single Cell Point To Multipoint
SFN System Frame Number
SI System Information
SIB System Information Block
TGMI Temporary Mobile Group Identity
UE User Equipment
USD User Service Description
V2X Vehicle-to-Everything Even though the disclosure has been described above with reference to an example according to the accompanying drawings, it is clear that the exemplary embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the exemplary embodiments can be implemented in various ways. Further, it is clear to a person skilled in the art that the described embodiments may, but are not required to, be combined with other embodiments in various ways.

The invention claimed is:

1. A method performed by a user equipment (UE) within a radio communication network, the method comprising:
   receiving multicast data via a multicast transport channel,
   wherein the multicast transport channel is associated with a plurality of multicast control channels,
   wherein each of the plurality of multicast control channels has at least one multicast control channel configuration, and
   wherein the at least one multicast control channel configuration is associated with at least one location indicator.

2. The method according to claim 1, further comprising:
   receiving a plurality of first quality of service values, wherein each of the plurality of first QoS values has an associated first location indicator;
   receiving a plurality of multicast control channel configurations comprising the at least one multicast control channel configuration, wherein each of the plurality of multicast control channel configurations has an associated second QoS value;
   determining a present location of the UE;
   selecting, the plurality of first QoS values which, a QoS value having an associated first location indicator that matches the determined present location;
   selecting the at least one of the plurality of multicast control channel configurations having the associated second QoS value that matches the selected QoS value; and
   monitoring one of the plurality of multicast control channels that is associated with the selected multicast control channel configuration.

3. The method according to claim 1, further comprising:
   receiving at least one first quality of service value, and associated first location indicator;
   receiving a plurality of multicast control channel configurations comprising the at least one multicast control channel configuration, wherein each of the plurality of multicast control channel configurations is associated with at least one second QoS value, and at least one associated second location indicator;
   determining a present location of the user equipment;
   determining, from the at least one first QoS value, a third QoS value, having an associated first location indicator that matches the determined present location;
   selecting one of the plurality of multicast control channel configurations having the associated second QoS value that matches the determined third QoS value; and
   monitoring one of the plurality of multicast control channels that is associated with the selected multicast control channel configuration.

4. The method according to claim 1, further comprising:
   receiving at least one first group identifier and at least one associated first location indicator;
   receiving a plurality of multicast control channel configurations comprising the at least one multicast control channel configuration, wherein each of the plurality of multicast control channel configurations is associated with at least one second group identifier and at least one associated second location indicator;
   determining a present location of the user equipment;
   determining, from the at least one first group identifier, a third group identifier having an associated first location indicator that matches the determined present location;
   selecting one of the plurality of multicast control channel configurations having the associated second group identifier that matches the third group identifier; and
   monitoring one of the plurality of multicast control channels that is associated with the selected multicast control channel configuration.

5. The method according to claim 1, further comprising:
   transmitting a join message requesting to join a multicast group;
   receiving, in response to the join message, a plurality of multicast control channel configurations, wherein each of the plurality of multicast control channel configurations is associated with at least one location indicator;
   determining a present location of the user equipment;
   selecting one of the plurality of multicast control channel configurations having an associated location indicator that matches the determined present location; and
   monitoring one of the plurality of multicast control channels that is associated with the selected multicast control channel configuration.

6. A method performed by a network apparatus within a radio communication network, the method comprising:
   transmitting multicast data via a multicast transport channel, wherein the multicast transport channel is associated with a plurality of multicast control channels, wherein each of the plurality of multicast control channels has at least one multicast control channel configuration, and wherein the at least one multicast control channel configuration is associated with at least one location indicator.

7. The method according to claim 6, further comprising:
   transmitting a plurality of first quality of service values, wherein each of the plurality of first QoS values has an associated first location indicator;

determining a plurality of multicast control channel configurations comprising the at least one multicast control channel configuration, and associated matching information, wherein the matching information comprises at least one second QoS value;
transmitting the determined plurality of multicast control channel configurations and the associated matching information; and
transmitting control information via the plurality of multicast control channels based on the determined plurality of multicast control channel configurations.

8. The method according to claim 6, further comprising:
transmitting at least one first quality of service (QoS) value and at least one associated first location indicator;
determining a plurality of multicast control channel configurations comprising the at least one multicast control channel configuration, and associated matching information, wherein the matching information comprises at least one second QoS value and at least one associated second location indicator;
transmitting the determined plurality of multicast control channel configurations and the associated matching information; and
transmitting control information via the plurality of multicast control channels based on the determined plurality of multicast control channel configurations.

9. The method according to claim 6, further comprising:
transmitting at least one first group identifier and at least one associated first location indicator;
determining a plurality of multicast control channel configurations comprising the at least one multicast control channel configuration, and associated matching information, wherein the matching information comprises at least one second group identifier and at least one associated second location indicator;
transmitting the determined plurality of multicast control channel configurations and the associated matching information; and
transmitting control information via the plurality of multicast control channels based on the determined plurality of multicast control channel configurations.

10. The method according to claim 6, further comprising:
receiving a join message requesting to join a multicast group;
determining a plurality of multicast control channel configurations comprising the at least one multicast control channel configuration, and associated matching information, wherein the matching information comprises at least one associated location indicator;
transmitting, in response to the join message, the determined plurality of multicast control channel configurations and the associated matching information; and
transmitting control information via the plurality of multicast control channels based on the determined plurality of multicast control channel configurations.

11. An apparatus comprising at least one processor, at least one memory including computer program code, and at least one communication module, the at least one memory and the computer program code being configured, with the at least one processor, and the at least one communication module, to cause the apparatus at least to:
receive multicast data via a multicast transport channel (MTC),
wherein the multicast transport channel is associated with a plurality of multicast control channels,
wherein each of the plurality of multicast control channels has at least one multicast control channel configuration, and
wherein the at least one multicast control channel configuration is associated with at least one location indicator.

12. The apparatus (UE) according to claim 11, wherein the apparatus is further configured to:
receive a plurality of first quality of service values, wherein each of the plurality of first QoS values has an associated first location indicator;
receive a plurality of multicast control channel configurations comprising the at least one multicast control channel configuration, wherein each of the plurality of multicast control channel configurations has an associated second QoS value;
determine a present location of the UE;
select, from the plurality of first QoS values, a QoS value having an associated first location indicator that matches the determined present location;
select one of the plurality of multicast control channel configurations, having the associated second QoS value that matches the selected QoS value; and
monitor one of the plurality of multicast control channels that is associated with the selected multicast control channel configuration.

13. The apparatus (UE) according to claim 11, wherein the apparatus is further configured to:
receive at least one first quality of service (QoS) value and at least one associated first location indicator;
receive a plurality of multicast control channel configurations comprising the at least one multicast control channel configuration, wherein each of the plurality of multicast control channel configurations is associated with at least one second QoS value, and at least one associated second location indicator;
determine a present location of the user equipment;
determine, from the at least one first QoS value, a third QoS value, having an associated first location indicator that matches the determined present location;
select one of the plurality of multicast control channel configurations which having the associated second QoS value that matches the determined third QoS value; and
monitor one of the plurality of multicast control channels that is associated with the selected multicast control channel configuration.

14. The apparatus (UE) according to claim 11, wherein the apparatus is further configured to:
receive at least one first group identifier and at least one associated first location indicator;
receive a plurality of multicast control channel configurations comprising the at least one multicast control channel configuration, wherein each of the plurality of multicast control channel configurations is associated with at least one second group identifier and at least one associated second location indicator;
determine a present location of the apparatus;
determine, from the at least one first group identifier, a third group identifier, having an associated first location indicator that matches the determined present location;
select one of the plurality of multicast control channel configurations, having the associated second group identifier that matches the third group identifier; and
monitor one of the plurality of multicast control channels that is associated with the selected multicast control channel configuration.

15. The apparatus (UE) according to claim 11, wherein the apparatus is further configured to:
- transmit a join message requesting to join a multicast group;
- receive, in response to the join message, a plurality of multicast control channel configurations, wherein each of the plurality of multicast control channel configurations is associated with at least one location indicator;
- determine a present location of the apparatus;
- select one of the plurality of multicast control channel configurations if having an associated location indicator that matches the determined present location; and
- monitor one of the plurality of multicast control channels that is associated with the selected multicast control channel configuration.

16. An apparatus comprising at least one processor, at least one memory including computer program code, and at least one communication module, the at least one memory and the computer program code being configured, with the at least one processor, and the at least one communication module, to cause the apparatus (SNET, RAN, 5GC) at least to:
- transmit multicast data via a multicast transport channel (MTC), wherein the multicast transport channel is associated with a plurality of multicast control channels, wherein each of the plurality of multicast control channels has at least one multicast control channel configuration, and wherein the at least one multicast control channel configuration is associated with at least one location indicator.

17. The apparatus (SNET, RAN 5GC, AF) according to claim 16, wherein the apparatus is further configured to:
- transmit a plurality of first quality of service values, wherein each of the plurality of first QoS values has an associated first location indicator;
- determine a plurality of multicast control channel configurations comprising the at least one multicast control channel configuration, and associated matching information, wherein the matching information comprises at least one second QoS value;
- transmit the determined plurality of multicast control channel configurations and the associated matching information; and
- transmit control information via the plurality of multicast control channels based on the determined plurality of multicast control channel configurations.

18. The apparatus (SNET, RAN 5GC, AF) according to claim 16, wherein the apparatus is further configured to:
- transmit at least one first quality of service (QoS) value and at least one associated first location indicator;
- determine a plurality of multicast control channel configurations comprising the at least one multicast control channel configuration, and associated matching information, wherein the matching information comprises at least one second QoS value and at least one associated second location indicator;
- transmit the determined plurality of multicast control channel configurations and the associated matching information; and
- transmit control information via the plurality of multicast control channels based on the determined plurality of multicast control channel configurations.

19. The apparatus (SNET, RAN 5GC, AF) according to claim 16, wherein the apparatus is further configured to:
- transmit at least one first group identifier and at least one associated first location indicator;
- determine a plurality of multicast control channel configurations comprising the at least one multicast control channel configuration, and associated matching information, wherein the matching information comprises at least one second group identifier and at least one associated second location indicator;
- transmit the determined plurality of multicast control channel configurations and the associated matching information; and
- transmit control information via the plurality of multicast control channels based on the determined plurality of multicast control channel configurations.

20. The apparatus (SNET, RAN 5GC, AF) according to claim 16, wherein the apparatus is further configured to:
- receive a join message requesting to join a multicast group;
- determine a plurality of multicast control channel configurations comprising the at least one multicast control channel configuration, and associated matching information, wherein the matching information comprises at least one associated location indicator;
- transmit, in response to the join message, the determined plurality of multicast control channel configurations and the associated matching information; and
- transmit control information via the plurality of multicast control channels based on the determined plurality of multicast control channel configurations.

* * * * *